United States Patent [19]

Crozer

[11] Patent Number: 4,976,782
[45] Date of Patent: Dec. 11, 1990

[54] WATER-BASED WOOD STAIN

[76] Inventor: Veva W. Crozer, 19 Rockwood La., Greenwich, Conn. 06830

[21] Appl. No.: 329,017

[22] Filed: Mar. 27, 1989

[51] Int. Cl.$^5$ .............................................. C09D 15/00
[52] U.S. Cl. ........................................ 106/19; 106/24; 106/30; 106/32; 106/34; 106/311
[58] Field of Search ...................... 106/19, 24, 30, 32, 106/34, 311; 8/402

[56] References Cited

U.S. PATENT DOCUMENTS

| | | | |
|---|---|---|---|
| 2,302,837 | 11/1942 | Bucy | 106/34 |
| 3,391,081 | 6/1968 | Conrady | 106/32 |
| 4,366,627 | 1/1983 | Hager | 8/402 |
| 4,386,180 | 5/1983 | Lat et al. | 106/34 |
| 4,432,797 | 2/1984 | Vasishth et al. | 106/3 |
| 4,750,934 | 6/1988 | Netzner et al. | 106/18 |
| 4,792,356 | 12/1988 | Ruldolphy et al. | 106/239 |
| 4,814,016 | 3/1989 | Adkins et al. | 106/250 |

Primary Examiner—William R. Dixon, Jr.
Assistant Examiner—Helene Klemanski
Attorney, Agent, or Firm—Levisohn, Lerner & Berger

[57] ABSTRACT

A composition for use as a wood stain comprises water, glycerin, mineral or baby oil, and a flexographic printing ink as the pigment provider. The composition is transparent and translucent, easy to apply, quick to dry and can be formulated in a large variety of colors. Thus, a water based wood stain is provided which is expected to meet or exceed expected EPA standards. A principal advantage of the composition is provision of an enormous range of colors which can be certified as consistent in color match by existing color specification systems, e.g., Pantene color matching system.

12 Claims, No Drawings

WATER-BASED WOOD STAIN

BACKGROUND OF THE INVENTION AND DESCRIPTION OF THE PRIOR ART

The present invention relates to compositions for use in staining wood, and more particularly to a water-based wood stain composition available in a large variety of colors.

Typically, compositions used for staining wood are characterized by an oil base which acts as a vehicle for carrying the colorant of the composition. More often than not, such compositions require lengthy drying times after application to a wood surface. Moreover, the Environmental Protection Agency is implementing restrictions which will eliminate oil-based wood stains from the market. Accordingly, the need exists for a quick-drying wood stain composition which will comply with EPA regulations.

Water-based compositions for covering wood have been proposed in the past and are available on the market. However, water-based latex paint compositions including pigment and glycerin as components sit on the surface of the wood, are semiopaque and tend to hide the natural grain of the wood surface. Water-based compositions including water-soluble aniline dyes as a component have also been developed. See, for example, U.S. Pat. No. 2,302,837 to Bucy and U.S. Pat. No. 1,930,178 to Mizener. However, oil-based stain compositions give a non-transparent appearance (latex based stains are cloudy) on the surface of the wood after drying and the relative coarseness of dyes makes the composition difficult to handle during application.

Finally, water-based compositions containing pigment and alkyd resins have been formulated for use as wood stains. U.S. Pat. No. 4,386,180 to Lat et al. discloses a quick-drying water-based stain for wood comprising an acrylic latex, drying oil, ester gum, glycol, hydrocarbonaceous solvent and pigment. U.S. Pat. Nos. 4,432,797 and 4,276,329 teach water-based wood stains comprising pigment and an alkyd resin to give high viscosity and prevent pigment settling. However, such compositions are characterized by either complex binding systems or slow-drying components.

Accordingly, the need stills exists for a wood stain composition which complies with EPA regulations, possesses adequate transparency to enhance the natural grain of the wood, is characterized by good absorption into wood and short drying periods, and can be simply and economically formulated in a wide variety of colors. Color matching has been extremely difficult with aniline dyes.

Ease of application by the consumer is also very important. The current composition, disclosed herein, is very "forgiving" and has an open time which allows the user to cover large areas without "lapping", i.e., overlapping problems.

SUMMARY OF THE INVENTION

It is an object of the present invention to provide a composition for staining wood possessed of the following characteristics: a water base, good wood absorption, transparency after drying, ease of application and drying, simple formulation, and wide color selection. Standardized and certifiable color matching to an enormous color range is also available by the present invention.

These and other objects are achieved in accordance with the present invention by a composition for use as a wood stain comprising a flexographic printing ink, mineral oil or baby oil, a glycol or glycerine and water.

Acceptability by anticipated EPA standards and easy water clean-up are also provided by the present invention.

DETAILED DESCRIPTION OF THE PREFERRED EMBODIMENT

The first component of the composition of the present invention is a flexographic printing ink. A full discussion of flexographic printing inks can be found in the "Printing Ink Handbook" (4th Edition 1980) and "Flexography: Principles and Practices" (Third Edition 1980), the contents of both of which are incorporated by reference herein.

As used in the present invention, the term "flexographic printing ink" refers to water-based printing ink formulations conventionally used in flexographic printing processes. These generally consist of at least one solid pigment dispersed in a fluid vehicle.

Vehicles for water-based flexographic printing inks comprise aqueous solutions of ammonia or amonic-solubilized protein, shellac, esterified fumarated resins, acrylic copolymers, or thin mixtures. Those water-based inks comprise alkaline solutions of acidic resins, i.e., water soluble resins similar to soap. They dry water-insoluble by evaporation of the ammonia or volatile amines The soapy nature of the vehicle helps wet and disperse pigments in much the same manner that hand soaps wet and disperse grease. The vehicle then acts as a carrier for the pigment and as a binder to affix the pigment to a surface.

While there exist oil-based or solvent-based flexographic printing inks; these are not contemplated for use in the present invention because of EPA restrictions.

The flexographic printing ink component of the composition of the present invention is the pigment provider. The vehicle constitutes an aqueous solution for the dispersion or suspension of a finely-ground solid pigment therein. A mixture of one or more of the pigments conventionally used in flexographic printing inks may be employed, thus enabling the selection of a huge variety of colorings depending on the desired final color of the wood stain. For example, the BASF Corporation provides a complete line of water-based printing inks including a tremendous variety and selection of pigments, thus facilitating the selection of any desired color for use in the present invention.

The second component of the composition of the present invention is a glycol, preferably glycerin. The glycol acts as a surfactant or suspending agent to form an emulsion of the flexographic printing ink pigment in water.

The third component of the composition of the present invention is mineral oil or baby oil. The oil acts to increase the absorbency of the printing ink in water, thus facilitating the use of very liquid, high water content compositions, if desired. Moreover, the oil acts as a retarder to drying, thus extending the useful life of the composition and making application of the stain very simple. Finally, the proportion of oil used in the composition can be varied to adjust the overall viscosity, drying time and color intensity of the composition.

The glycol and mineral or baby oil also operate together to diminish any raising of the natural grain of the wood to which the composition is applied. Without these components, the water content of the composition would result in unsightly raising of the grain of the wood after application and a dry time that would be too fast for practical consumer application.

The fourth component of the composition of the present invention is water, which acts as the overall carrier or vehicle for the composition of the present invention and as a dilutant for the pigment of the printers ink.

The proportions of the four basic components of the composition of the present invention can be varied widely to provide a product ranging from a thick creamy viscous liquid to a very thin liquid, depending on application requirements and the desired final appearance. A preferred composition is made of equal parts, by weight, of flexographic printing ink, glycol, oil and water. Additional surfactants and drying agents may be added in amounts up to about 5% by weight. Moreover, the flexographic printing ink component may contain conventional additives such as wax and lubricants. The combined amount of the water component and water in the flexographic printing ink component may range as high as 65% by weight, depending on the desired final viscosity of the composition, which may be varied as desired to achieve particular application requirements.

The present invention thus provides a water-based composition for use as a wood stain which meets EPA requirements, is simply formulated, non-toxic and substantially transparent upon drying, and can be prepared in a huge variety of colors. EXAMPLE:

A composition for use as a wood stain is formulated in accordance with the present invention from the following components:

| 1. | Water | 25% by weight |
|----|-------|---------------|
| 2. | Glycerin | 25% by weight |
| 3. | Mineral Oil | 25% by weight |
| 4. | BASF AQUALABEL high gloss prepackaged flexographic water-based printers ink | 25% by weight |

The composition possesses a moderate viscosity, is easily applied to a wood surface and dries to the touch in about an hour. It should be appreciated that the wood, after staining, should be allowed to dry about 24 hours before top coating with an oil based urethane. If, however, the top coating is to be with a water based urethane compositions may need up to 72 hours of drying to prevent color distortions.

It has been discovered that the composition, to minimize separation between components, should be "blended" in the following preferred order:
1. Ink
2. Oil (mineral or baby)
3. Glycerin
4. Water The addition of the glycerin facilitates the addition of more of the oil component and creates a more fluid composition. If no glycerin is used and too much oil is added, the mixture would separate and blending, i.e., true mixing could not further take place without the addition of more of the ink component. Adding additional ink, however, is not desirable since it may prevent attaining color uniformity from batch to batch.

It will be appreciated that while the present invention has been described with reference to specific and preferred embodiments thereof, this is not done by way of limitation, and various modifications will suggest themselves to those of ordinary skill in the art which fall within the spirit and scope of the present invention as set forth in the appended claims.

What I claim is:

1. A composition for use as a wood stain comprising water, a glycol, mineral oil and a flexographic printing ink, comprising an alkaline solution of an acidic resin and at least one pigment dispersed in said resin, wherein said water, glycol, mineral oil and flexographic printing ink are present in about equal proportions by weight.

2. A composition as set forth in claim 1, wherein said glycol is glycerin.

3. A composition for use as a wood stain comprising water, a glycol, baby oil and a flexographic printing ink, comprising an alkaline solution of an acidic resin and at least one pigment dispersed in said resin, wherein said water, glycol, baby oil and flexographic printing ink are present in about equal proportions by weight.

4. A composition as set forth in claim 3, wherein said glycol is glycerin.

5. A composition as set forth in claim 1, wherein said composition is blended in the order: ink and mineral oil, then glycol and finally water.

6. A composition as set forth in claim 3, wherein said composition is blended in the order: ink and baby oil, then glycol and finally water.

7. A composition for use as a wood stain comprising water, a glycol, mineral oil and a flexographic printing ink comprising at least one pigment dispersed in a vehicle selected from the group consisting of ammonia or amine-solubilized protein, shellac, esterified fumarated resins, acrylic copolymers and mixtures thereof, wherein said water, glycol, mineral oil and flexographic printing ink are present in about equal proportions by weight.

8. A composition as set forth in claim 7, wherein said glycol is glycerin.

9. A composition as set forth in claim 7, wherein said composition is blended in the order: ink and mineral oil, then glycol and finally water.

10. A composition for use as a wood stain comprising water, a glycol, baby oil, and a flexographic printing ink comprising at least one pigment dispersed in a vehicle selected from the group consisting of ammonia or amine-solubilized protein, shellac, esterified fumarated resins, acrylic copolymers and mixtures thereof, wherein said water, glycol, baby oil, and flexographic printing ink are present in about equal proportions by weight.

11. A composition as set forth in claim 10, wherein said glycol is glycerin.

12. A composition as set forth in claim 10, wherein said composition is blended in the order: ink and baby oil, then glycol and finally water.

* * * * *